United States Patent [19]

Blee

[11] 4,273,317
[45] Jun. 16, 1981

[54] SERVO CONTROLLED VEHICLE SUSPENSION

[76] Inventor: Leonard J. Blee, 66 Leslie Ave.,, Blair Athol, South Australia, Australia

[21] Appl. No.: 950,362

[22] Filed: Oct. 11, 1978

[51] Int. Cl.$^3$ ............................................. B60G 21/06
[52] U.S. Cl. .................................... 267/64 A; 280/702
[58] Field of Search .............. 280/714, 710, 709, 702, 280/703, 617; 267/64 R, 64 A

[56] References Cited

U.S. PATENT DOCUMENTS

| | | | |
|---|---|---|---|
| 3,275,314 | 9/1966 | Ostwald | 267/64 A |
| 3,330,570 | 7/1967 | Sherrill | 267/64 R X |
| 3,810,611 | 5/1974 | Ito et al. | 267/64 R |
| 3,873,121 | 3/1975 | Ito et al. | 267/64 A X |

Primary Examiner—John J. Love
Assistant Examiner—Norman L. Stack, Jr.
Attorney, Agent, or Firm—Norbert P. Holler

[57] ABSTRACT

A servo controlled vehicle suspension which will reduce the dynamic forces imparted to the relatively high inertia structure when the relatively low inertia structure moves, as for example when the wheel of a motor vehicle encounters a bump or dip in a road. The suspension includes resilient sensing device, a pump and a valve, the valve being controlled by the sensing device to deliver oil from the pump to a chamber which expands as the low inertia structure (the wheel) moves downwardly when a dip is encountered, the valve however being controlled to open a drain port to allow oil contained in the chamber to discharge to drain with relatively little resistance when the low inertia structure encounters a bump, the arrangement being such as to reduce the variation in force between the structures. Thus, oil flow from the chamber allows upward movement of the vehicle wheel to allow it to ride easily over a short duration bump with negligible increase in resistance, but oil flow into the chamber tends to resist the chassis from dropping with the wheel and in effect drives the wheel downwardly when the wheel encounters a dip in the road surface.

17 Claims, 8 Drawing Figures

SERVO CONTROLLED VEHICLE SUSPENSION

This invention relates to hydraulic suspension means which is suitable for interpositioning between a first structure such as the wheel assembly of a vehicle, and a second structure such as a vehicle chassis, with which the first structure is relatively movable. While the invention is particularly suitable for vehicle suspension, its use is not necessarily limited to vehicle suspension and as will be seen hereunder the use can be extended to control vehicle seats, aircraft landing gear and other applications wherein it is desirable or necessary to reduce the variation in force between two structures and amount of displacement of one structure as another structure moves with respect to it.

BACKGROUND OF THE INVENTION

In the case of a conventional vehicle suspension for a road vehicle which is required to move over uneven surfaces, there are two suspension features which are fundamentally undesirable, the first being that the spring must be capable of supporting much more than the weight of the vehicle, and if therefore a wheel is to negotiate a rise in the surface over which the vehicle travels, it is required to deflect the spring with a force much greater than that proportion of the vehicle weight which is applied to the wheel, and secondly, at the same time it is required to displace liquid in a shock absorber which, under extreme conditions, can apply very high forces to the chassis of the vehicle. Even further difficulties are encountered when a vehicle arranged to carry heavy loads is relatively lightly loaded, in that the ratio of spring deflection over applied force is so small that the result is a "rough ride". This has been compensated for in the past almost entirely by the mass of the sprung weight, or high inertia structure, and the wheel base dimensions. Thus a large motor car for example will give a much smoother ride than a small motor car. Furthermore, a lightly loaded vehicle may have reduced adhesion between the wheels and the road (if the road surface is rough). This results in some loss of control of the vehicle.

Improvements have been introduced in some suspension structures, and for example in one suspension structure which is well known, gas is used as the spring medium, and a variable quantity of hydraulic oil is interposed to maintain the body at constant height for variations in load. However even with this arrangement recovery of a vehicle to normal height after a variation of load takes several seconds to complete, and the system does not compensate for certain dynamic changes, for example nose dip under braking or squat under acceleration.

The need for automatic levelling suspension means for vehicles has been well recognised, and for example the Australian Pat. No. 226,525 issued to Thompson Products Inc. and the Austrailan Pat. No. 406,399 issued to Monroe Auto Equipment Co. both relate to devices for levelling of a vehicle, but in neither instance is provision made for reducing dynamic "rough ride" forces, responding to dynamic forces such as produced by road surface variations and reducing their effect on the vehicle.

There has also been considerable attention paid to the need to control body attitude, and for example in Australian Pat. No. 428,824 issued to Automotive Products Company Limited there is described and claimed a device utilising a pivotally suspended weight to effect such control, but again there is no provision for reducing "rough ride" forces, responding to dynamic forces such as produced by road surface variations and reducing their effect on the vehicle.

BRIEF SUMMARY OF THE INVENTION

The main object of this invention is to provide suspension means which will reduce the dynamic forces imparted to the relatively high inertia structure when the relatively low inertia structure moves, as for example when the wheel of a motor vehicle encounters a bump or dip in a road, and briefly in this invention use is made of a resilient compression sensing device, a pump and a valve, the valve being controlled by the sensing device to deliver oil from the pump to a chamber which expands at the low inertia structure (the wheel) moves downwardly when a dip is encountered, the valve however being controlled to open a drain port to allow oil contained in the chamber to discharge to drain with relatively little resistance when the low inertia structure encounters a bump, arranged so as to reduce the variation in force between the structures. Thus, on a road vehicle, the invention enables a wheel to ride up over a short duration bump almost without increase in resistance, and to be driven by hydraulic pressure into a dip without decrease of downward force, thereby removing from the "sprung structure" of the vehicle most of the forces which otherwise occur due to rough terrain.

Specifically, in this invention hydraulic suspension means suitable for interpositioning between a first structure and a second structure with which the first structure is relatively movable, comprises walls defining a pressure chamber, at least one of said walls being movable relative to the other said walls so that the pressure chamber is of variable volume, and means inter-connecting one of said relatively movable walls to one of said structures, a resilient sensing device interpositioned between a second of said relatively movable walls and the second said structure, a pump, a valve having a movable valve member and a drain port, a first conduit extending between the pump and the valve, a second conduit extending between the valve and the chamber, valve control means coupling the sensing device and the movable valve member and operable to move the valve member to a first position where it opens a pressure liquid flow path between the pump and chamber as said structures move apart so that the pump directs liquid flow into the chamber, said valve control means also being operable to move the valve member to a second position where it closes said pressure liquid flow path and opens a drain flow path between said second conduit and said drain port as said structures move towards each other so that some of the contents of the chamber are discharged to drain.

Various configurations of valve mounting can be used in this invention, and for example the valve can be mounted in one of the chamber walls, and the walls which define the chamber can be the walls of a resilient diaphragm or bellows, but as herein described are cylindrical walls and a surface of a piston. However, in order to achieve a smooth operation under the wide range of conditions which are encountered with a motor vehicle passing over a rough surface at varying speeds, in another aspect of the invention there is an intermediate body located between the structures, the walls comprising cylindrical walls defining the chamber being in the intermediate body and can include a surface of a piston sealably and slidably engaging the cylindrical walls, there being a piston rod extending from the piston, and means securing the extended end of the piston rod to one of said structures, the valve being in the body.

This arrangement makes possible an effective valve control means, and in a still further aspect of the invention further cylindrical walls define a second chamber coaxial with the cylindrical walls defining the first chamber, a second piston sealably and slidably engaging the cylindrical walls of the second chamber, a second piston rod extending from the second piston, and means securing the extended end of the second piston rod to the other said structure, the movable valve member being in fluid flow communication with the second chamber and arranged to be displaced to the open position upon expansion of volume of the second chamber but to move to a closed position upon reduction of that volume.

With this arrangement the second cylinder can be deemed a "servo control" cylinder and the second piston a "servo control" piston, the resilient compression sensing device interpositioned between the intermediate body and the second structure (the chassis of the vehicle in the case of a vehicle) establishing a full servo system which provides a smooth control of the body.

BRIEF DESCRIPTION OF THE DRAWINGS

The invention is described hereunder in some detail with reference to and is illustrated in the accompanying drawings, in which.

Figure 6:
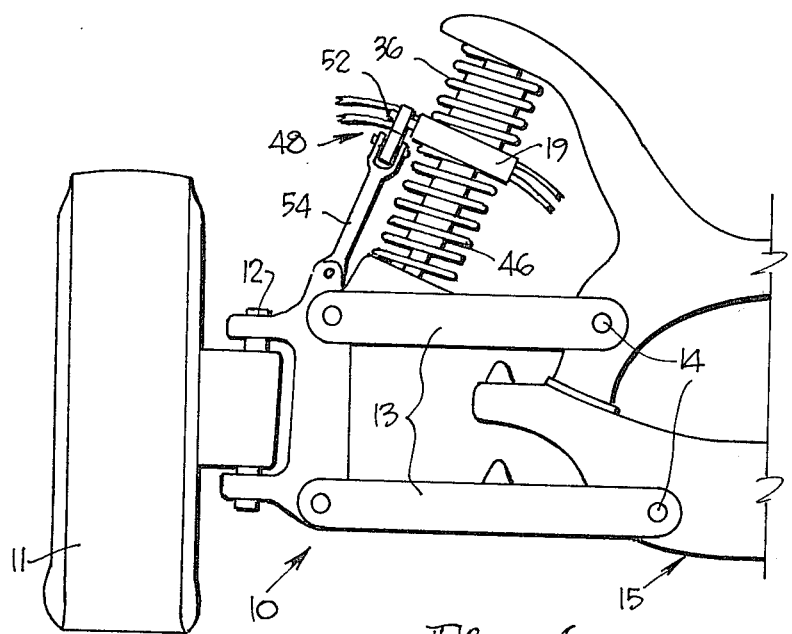
FIG. 6 is a fragmentary end elevational view showing the suspension means of FIG. 4 as could be used on the front end of a motor vehicle.

In this invention a front wheel assembly designated 10 in FIG. 6 comprises a wheel 11 of a motor vehicle, a king pin 12, a pair of spaced control arms 13, and pivot means 14 at the inner ends of control arms 13 pivoting the control arms to a chassis 15 of a vehicle. The front cross member only of the chassis 15 is illustrated herein, but it will be appreciated that the front wheel assembly 10 is a relatively low inertia structure (herein called a "first" structure) and the chassis 15 is a relatively high inertia structure (herein called a "second" structure) with which the first structure is relatively movable as the wheel traverses bumps or dips on a road surface.

Figure 2:
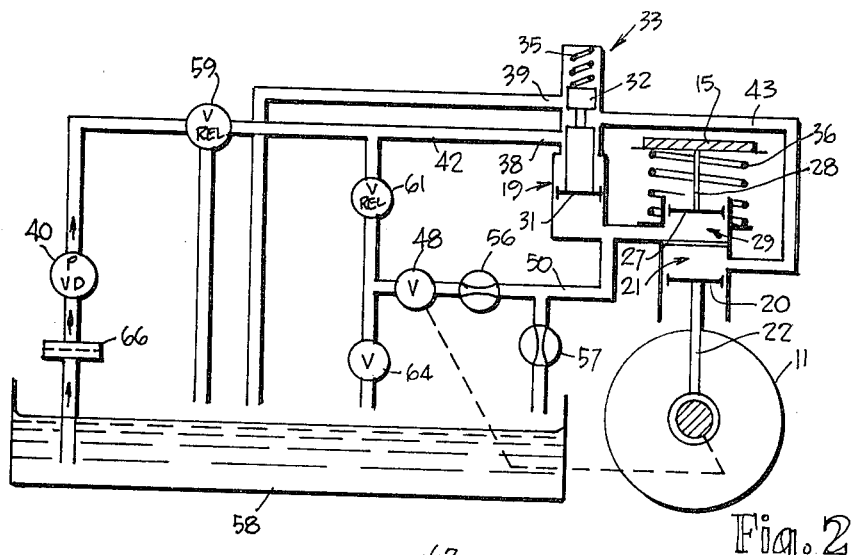
FIG. 2 is a similar diagrammatic representation of a second embodiment wherein a pressure reducing valve is used in lieu of a second pump to provide a relatively low pressure hydraulic oil supply for the second chamber.
Figure 3:
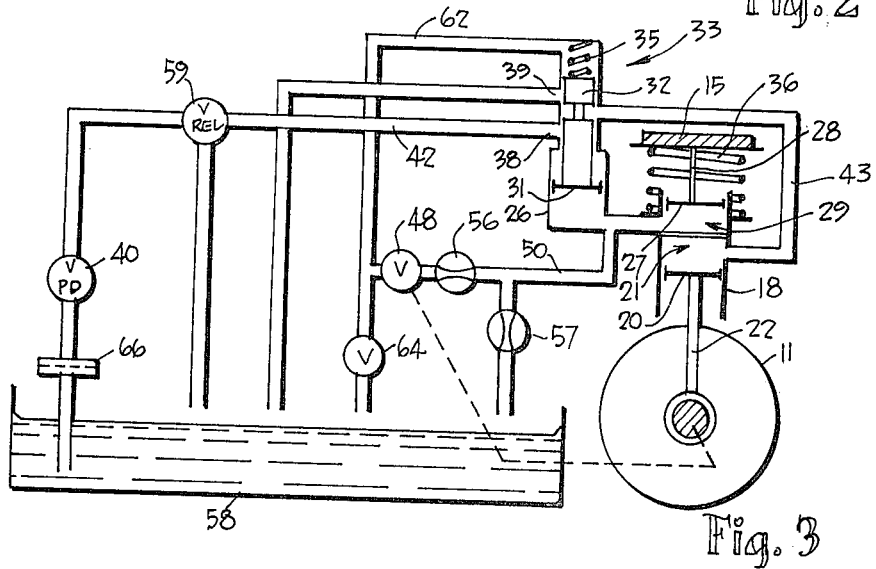
FIG. 3 is a further diagrammatic representation of the hydraulic control means wherein leakage oil from the valve is used to provide the relatively low pressure for the second chamber.
Figure 4:
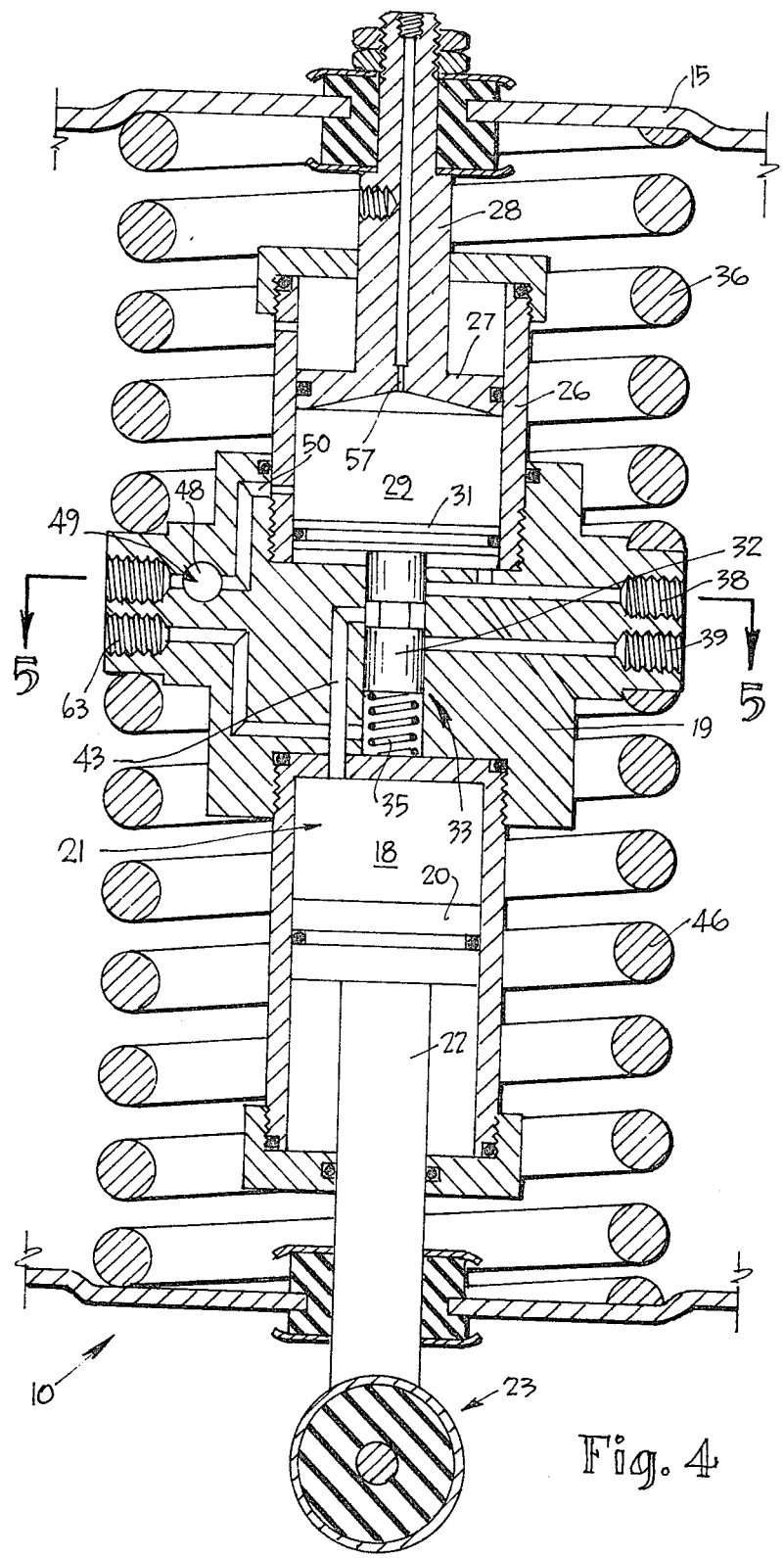
FIG. 4 is a central section through a suspension assembly which embodies the invention.

Reference is now made to FIGS. 1, 2, 3 and 4 of the drawings, wherein cylindrical walls 18 of an intermediate body 19 co-operate with the upper surface of a piston 20 to define a first chamber designated 21, which is a pressure chamber of variable volume. The piston 20 is provided with a depending piston rod 22 secured to the front wheel assembly 10 as shown in FIG. 4 by means of a rubber mounting 23. (In some instances this arrangement is the rear wheel assembly).

The intermediate body 19 is connected to the chassis 15 by means of a servo cylinder 26 and piston 27 through a piston rod 28 as shown best in FIG. 4, the piston 27 and cylinder 26 themselves defining a second chamber designated 29 which is also of variable volume, and the walls of the two cylinders 18 and 26 are co-axial (although in some embodiments this co-axial feature is not preferred). It should be noted that FIGS. 1, 2 and 3 are diagrammatic only and that the cylinders 18 and 26 are not shown therein as being coaxially arranged.

The servo cylinder 26 contains a second piston 31 which is a servo control piston and which is directly coupled to the spool 32 of a spool valve 33 also co-axial with the cylinders, the body of the spool valve 33 being the intermediate body 19. The spool 32 is a movable valve member urged upwardly by a small valve spring 35 (shown inverted for convenience in FIGS. 1, 2 and 3), and a servo sensing spring 36 is interpositioned between the intermediate body 19 and the chassis 15 as shown best in FIG. 4.

Figure 1:
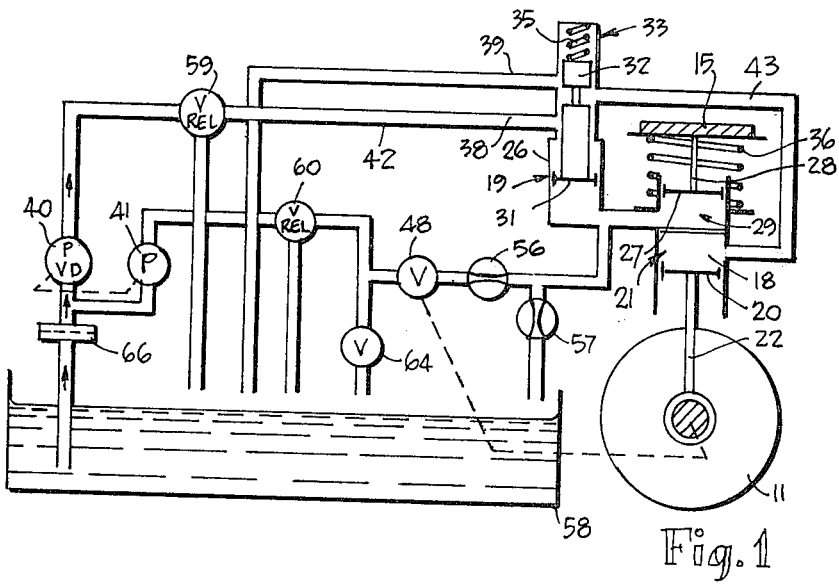
FIG. 1 is a diagrammatic representation of the hydraulic system used in a first and preferred embodiment.

The valve body 19 contains a high pressure inlet port 38, and a drain port 39, and the hydraulic circuit is provided with a high pressure pump 40 driven from the engine, and in the preferred embodiment of FIG. 1 also with a low pressure pump 41 to provide low pressure. A first high pressure conduit 42 extends from the high pressure pump 40 to the high pressure inlet port 38, while a second conduit designated 43 in FIG. 4 extends between the valve 33 and the first chamber 21.

When the movable valve member (the spool 32) is urged downwardly against spring 35, it firstly closes the fluid flow path from the high pressure conduit (the first conduit 42) to the first chamber 21, and upon further downward movement it interconnects the second conduit 43 with the drain port 39 allowing oil contained in the first chamber 21 to discharge to drain through the drain conduit 39. Such movement is caused by downward displacement of the servo control piston 31 with respect to its servo cylinder 26. However if the displacement of the piston 31 is in the opposite direction (due to the action of spring 36 urging the intermediate body 19 downwardly in FIG. 4) then the movable spool 32 is raised so as to connect the first chamber 21 to high pressure inlet port 38, and high pressure oil from the pump 40 is delivered through the fluid flow path between the first conduit 42, the inlet port 38 and the second conduit 43 into the first chamber to drive the piston 20 downwardly. The spring designated 46 which extends between the wheel assembly 10 and the intermediate body 19 functions to absorb some of the weight of the vehicle and thus reduce the energy requirement for the pump 40, but this feature is not essential for correct operation. It will be seen without reference to the further details set out below, that when the wheel 11 encounters a bump, assuming at that time the spool 32 is in an intermediate position as illustrated in FIG. 4, the upward movement will cause corresponding upward movement of the intermediate body 19, displacing some oil in the second chamber 29 so that the piston 31 is driven downwardly (with respect to its cylinder 26 and the intermediate body 19), opening the first chamber 21 to drain as the spool 32 moves downwardly. This is associated with some compression of the servo spring 36. It will be noted that the only force to be overcome is the very small initial force causing compression of the spring 36, and spring 35, the passage of oil from the first chamber 21 to drain being determined by the relative opening of the valve so that, in contrast to the usual shock absorber (and relatively heavy) spring arrangement, there is relatively small resistance to upward movement of the wheel and is not greatly affected by the rate of travel of the wheel assembly.

When the wheel recovers after traversing the bump, or alternatively when the wheel enters a dip, the compression force in spring 36 decreases allowing the spring 36 to lengthen in turn causing the piston 27 to rise relative to the intermediate body 19 and allowing servo piston 31 and thus the spool 32 to rise under action of the spring 35 so that high pressure oil is introduced by the reestablished fluid flow path from the high pressure conduit 42, through the second conduit 43 and into the first chamber 21 to introduce oil into the first chamber 21, driving the piston 20 downwardly and thereby driving the front wheel assembly 10 downwardly so that equilibrium conditions are restored, and maintaining an almost constant upward force on the body via spring 36.

Figure 5:
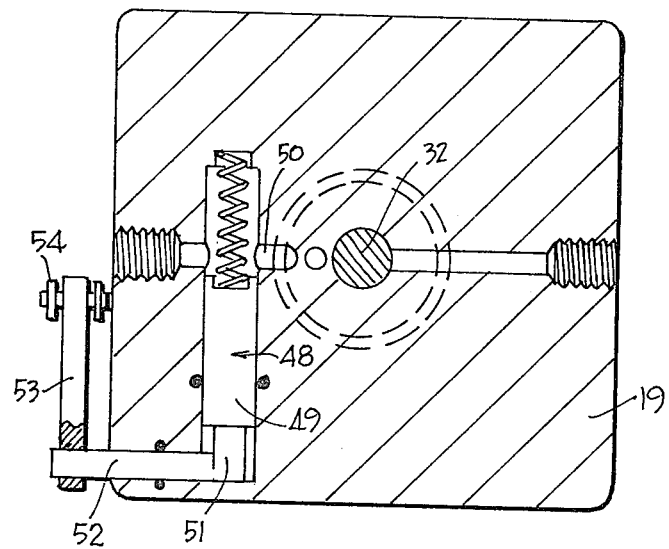
FIG. 5 is a section on line 5—5 of FIG. 4.

It is necessary to raise the chassis 15 from the front wheel assembly 10 so as to establish an equilibrium condition, and this is achieved by means of a sensing valve 48 which is illustrated in FIGS. 4, 5 and 6. The sensing valve 48 is a height sensing valve and comprises a plunger 49 movable in an aperture across an inlet conduit 50, the movement of the plunger 49 being effected by a cam 51 on the end of a rotatable spindle 52 connected to the wheel assembly 10 by means of a lever arm 53 and a link 54, as seen best in FIG. 6. When the required height is reached, the cam 51 drives the plunger 49 to a closure position where it tends to close the inlet conduit 50, whereupon the servo control piston 31 is caused to move downwardly, interrupting the fluid flow path between the first conduit 42 and the second conduit 43 so that equilibrium conditions are established. However there is a possibility that it is required to establish equilibrium conditions for the chassis 15 when the vehicle is on uneven ground, and to achieve this two wheels of the vehicle are interconnected by means of a thin torsion bar which twists if the wheels are at uneven heights, and the link 54 is coupled to the centre of the torsion bar so as to sense the average condition of this set of wheels. This arrangement is not illustrated herein.

As the vehicle traverses rough terrain, clearly the front wheel assembly 10 will rise and fall, and when it rises with respect to the chassis 15 the plunger 49 will allow the entry of further hydraulic oil into the second chamber 29. This difficulty is overcome by a bleed arrangement which is illustrated in FIGS. 1, 2 and 3. The valve 48 is upstream of two restrictors 56 and 57, the restrictor 56 passing approximately twice the amount of oil that the restrictor 57 passes, the arrangement being such that there is always a bleed through the restrictor 57 into the drain tank 58 even when valve 48 is closed, but when valve 48 is open there is a sufficient flow through restrictor 56 to supply not only the drain through the restrictor 57 but also the additional requirement to the servo cylinder 26 (the second chamber 29).

Detailed reference is now made to FIG. 1 which is the preferred embodiment. It is desirable that the first high pressure conduit 42 should receive oil at constant pressure, and this is achieved by means of a variable delivery constant pressure pump 40 feeding through a pressure relief valve 59, which functions as a "safety valve" in case of back pressure from the chamber 21 or failure of pump regulation and does not operate under normal conditions. The inlet conduit 50 is provided with constant pressure when valve 48 is opened in the embodiment of FIG. 1 through a second relief valve 60 in the line from the low pressure pump 41. In the embodiment of FIG. 2, instead of using a second pump 41, use is made of a pressure reducing valve 61 to provide the relatively low pressure for the valve 48, while in the third embodiment of FIG. 3 the low pressure is obtained through a conduit 62 through which passes hydraulic oil which leaks from the spool valve 33. As seen in FIG. 4, the leakage will pass through the port 63 if this method is used.

A jacking valve 64 is utilised in all embodiments, and when the valve 64 is open, pressure will decrease in the second chamber 29 so that the servo control piston 31 can rise under the influence of the spring 35 and the fluid flow path between the first and second conduits 42 and 43 is reestablished to drive the piston downwardly and thus jack the vehicle upwardly. Valve 64 is manually controlled.

In the description of the preferred embodiments above, the valve control means has been mechanical/hydraulic, for example in FIG. 4, being constituted by the piston 31 and spool 32 acting against spring 35 in valve 33.

Figure 7:
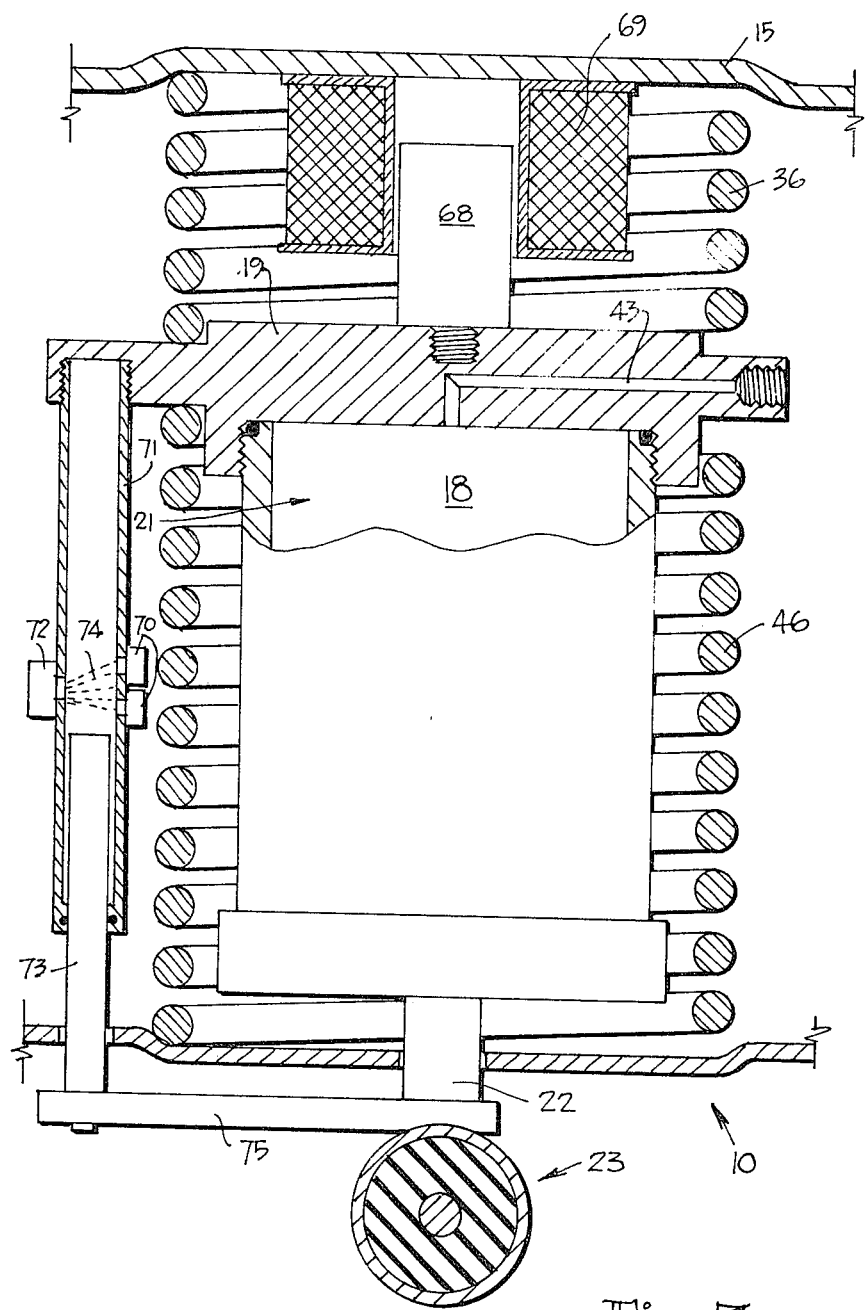
FIG. 7 is a section similar to FIG. 4 but showing an arrangement used if the valve control means is electric.
Figure 8:
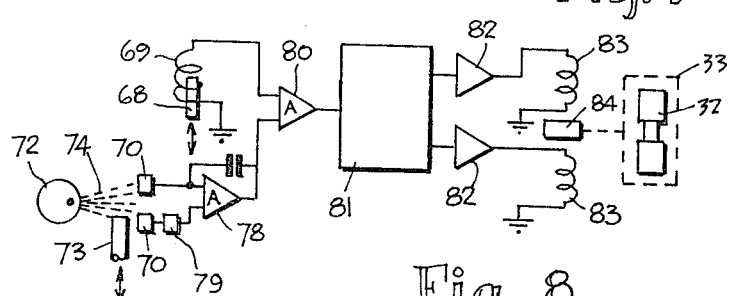
FIG. 8 is a circuit diagram of the electrical circuit used with the electric valve control means of FIG. 7 (but omitting the electric power supply circuit for the sake of clarity).

The valve control means however, need not necessarily be mechanical/hydraulic control means and indeed there are many advantages in utilising electrical means as illustrated in FIGS. 7 and 8. It is possible to employ electrical means which are less liable to breakdown than the mechanical/hydraulic means of FIG. 4, and in FIG. 7 the intermediate body 19 has upstanding from it a ferro-magnetic slug 68 which enters a coil 69 carried on the chassis 15, and this provides a "bump" control for the relatively high frequency low amplitude bumps encountered as a vehicle traverses a rough road.

The other requirement for the vehicle is to provide a position and attitude which is subject to a very low frequency high amplitude movement, and this is sensed by means of one, but preferably two, photo-electric cells 70 carried on a masking tube 71 which depends from the intermediate body 19, the energy for the cells 70 being received from a light source 72 and this is interrupted by a upwardly movable plunger 73 which interrupts the light beam 74 as load is taken by the pressure piston 20 of the cylinder 18. The plunger 73 is carried on an outrigger arm 75 on the piston rod 22.

Referring to the circuit of FIG. 8, the signal from the cells 70 are fed into a differential amplifier 78, one of them through an inverter 79 while a signal through the coil 69 is combined with the output of amplifier 78 to feed into a summing amplifier 80, and this in turn feeds into a multi-vibrator 81, the output of which extends through two upper amplifiers each designated 82 and these intermittently energise respective coils 83 which selectively attract the armature 84 coupled to the spool 32 of the spool valve 33. In other respects the device works in the same way as in the first embodiment. Alternatively use can be made of a masking arrangement for masking the light beam instead of utilising a coil 69, and still further alternatively use may be made of a metal cylinder which extends over the dielectrically shielded rod depending from chassis 15. Such variations will be seen to be electrical equivalents to the embodiment described and illustrated in FIGS. 7 and 8.

In all instances use is made of a filter 66 to clean the hydraulic oil of the circuit which may be utilised in other positions for example return line to tank.

The invention has been described with respect to a motor vehicle, but the invention can be applied to the landing wheels of an aircraft, or to a vehicle seat, or any other application where it is required to maintain a relatively smooth condition, to maintain attitude, and to maintain height and level of one structure with respect to another which is movable. The spool valve may be a double acting cylinder and valve arranged to drive the wheel assembly upwardly over a bump as well as downwardly into a depression, but the improvement achieved by use of a double acting valve and cylinder is usually insufficient to warrant the further expense.

The physical size of the suspension means is similar to the physical size of a shock absorber which it might replace, and substitution can be effected in some instances.

The resilient sensing spring 36 will vary its length by only a small amount, since the spool 32 causes rapid response. The force between the structures therefore remains almost constant and consequently the vehicle body is not subject to the same intermittent and irregular forces experienced with conventional suspension.

I claim:

1. Hydraulic suspension means suitable for interpositioning between a first structure and a second structure which said structures are relatively movable, comprising:
    walls defining a pressure chamber, at least one of said walls being movable relative to the other said walls so that the pressure chamber is of variable volume, and means interconnecting one of said relatively movable walls to one of said structures,
    a resilient sensing device interpositioned between a second of said relatively movable walls and the second said structure and arranged to sense movement therebetween responsive to variations in compressive force,
    a pump,
    a valve having a movable valve member and a drain port, a first conduit extending between the pump and the valve, a second conduit extending between the valve and the chamber, and valve control means coupling the sensing device and the movable valve member and operable to move the valve member to a first position where it opens a pressure liquid flow path between the pump and chamber as said structures move apart so that the pump directs liquid flow into the chamber to thereby expand the chamber volume and assist said movement apart,
    said valve control means also being operable to move the valve member to a second position where it closes said pressure liquid flow path and opens a drain flow path between said second conduit and said drain port as said structures move towards each other so that some of the contents of the chamber are discharged to drain to thereby allow movement of said structures toward each other without proportional increase in resistance to that movement.

2. Hydraulic suspension means according to claim 1 further comprising an intermediate member interpositioned between said first and second structures,
    said walls defining the pressure chamber comprising cylindrical walls in the intermediate member and a surface of a pressure piston which said piston slidably and sealably engages said cylindrical walls,
    said inter-connecting means between a wall and structure being a piston rod extending from said pressure piston and secured at its extended end to said first structure.

3. Hydraulic suspension means according to claim 2 wherein said sensing device comprises a servo sensing spring inter-positioned between said intermediate member and the second said structure.

4. Hydraulic suspension means suitable for interpositioning between a vehicle wheel assembly of a vehicle and the chassis of that vehicle, comprising:
    an intermediate member interpositioned between the vehicle wheel assembly and the chassis, a pressure cylinder defined by cylindrical walls of the intermediate member, a pressure piston slidably and sealably engaging said cylindrical walls, a piston rod extending from the pressure piston and having means securing its extended end to said wheel assembly, a resilient sensing spring interpositioned between the intermediate member and the chassis,
    a pressure sensing device coupled between the intermediate member and the chassis,
    a pump arranged to supply liquid at pressure to said pressure cylinder,
    a valve having a movable valve member and a drain port, a first conduit extending between the pump and the valve, a second conduit extending between the valve and the pressure cylinder, and
    valve control means coupling the pressure sensing device and the movable valve member and operable to move the valve member to a first position wherein it opens a pressure liquid flow path between the pump and pressure cylinder as the structures move apart so that the pump directs liquid flow into the cylinder to thereby expand the cylinder volume and assist said movement apart,
    said valve control means also being operable to move the valve member to a second position wherein it closes said pressure liquid flow path and opens a drain flow path between said second conduit and said drain port as the wheel assembly and chassis move towards each other so that some of the contents of the cylinder are discharged to drain to thereby allow movement of said vehicle wheel assembly and said chassis toward each other without proportional increase in resistance to that movement.

5. Hydraulic suspension means according to claim 4 wherein said sensing device comprises a servo cylinder extending from the intermediate member and coaxial with the pressure cylinder, a valve in the intermediate member coaxial with the servo cylinder, a servo piston slidably and sealably engaging the walls of the servo cylinder, the valve spool extending from but secured to the servo piston and being movable thereby within the valve to said valve positions, a spring in the intermediate member urging the servo piston and valve spool inwardly into the servo cylinder, a further piston slidably and sealably engaging the cylindrical walls of the servo-cylinder, and a further piston rod extending from the further piston and having means securing it to the vehicle chassis.

6. Hydraulic suspension means according to claim 5 further comprising liquid supply means arranged to supply liquid at relatively low pressure to the servo cylinder, the arrangement being such that displacement of liquid in the servo cylinder is accompanied by corresponding displacement of the servo piston.

7. Hydraulic suspension means according to claim 5 further comprising a conduit in the intermediate member opening at one end into the servo cylinder and at the other end into a port, that said conduit containing a valve which is actuated by displacement of the intermediate member with respect to the wheel assembly and which, when closed, retains liquid in the servo cylinder, the arrangement being such that movement of the intermediate member with respect to the chassis causes movement of the servo cylinder over said further piston and consequential displacement of the servo piston with respect to the valve causing the valve member to move between said positions.

8. Hydraulic suspension means according to claim 5 wherein said pump is a relatively high pressure pump and further comprising a low pressure supply means arranged to supply liquid at relatively low pressure to the servo cylinder.

9. Hydraulic suspension means according to claim 8 wherein said low pressure supply means comprises a further pump.

10. Hydraulic suspension means according to claim 8 wherein said low pressure supply means comprises a pressure reducing valve coupled to the output of said pump.

11. Hydraulic suspension means according to claim 8 wherein said low pressure supply means comprises a conduit extending from said valve in the intermediate member.

12. Hydraulic suspension means according to claim 8 wherein said low pressure liquid supply means comprises a pair of restrictors, one restrictor having a relatively large orifice and being in the conduit line between the low pressure liquid supply means and the servo cylinder and the other said restrictor having a relatively small orifice and extending from said servo control cylinder to drain.

13. Suspension means according to claim 4 or claim 5, further comprising a height sensing valve in said intermediate member, means interconnecting said height sensing valve to said wheel assembly, said valve control means being pressure-actuated means, and conduit means extending between said pump, said height sensing valve and said pressure-actuated means so that said height sensing valve control said servo valve.

14. Suspension means for the coupling of two structures, one of which is a wheel assembly and the other a chassis of a vehicle, comprising:
a pressure fluid pump,
a servo valve the operation of which is controlled by displacement of the wheel assembly with respect to the chassis,
a resilient member operatively connecting said structures such that said displacement effects resilient deformation of said resilient member,
a pressure fluid-actuated extensible assembly also operatively connected between said structures, and
conduit means extending between said pump, said servo valve and said pressure fluid-actuated extensible assembly, the arrangement being constructed such that upon movement towards each other of said structures due to the wheel of the wheel assembly encountering a road surface bump, fluid flows from said extensible assembly and influx of pressure fluid from the pump into said extensible assembly is inhibited.

15. Suspension means for the coupling of two structures, one of which is a wheel assembly and the other a chassis of a vehicle, comprising:
a pressure fluid pump,
a servo valve the operation of which is controlled by displacement of the wheel assembly with respect to the chassis,
a resilient member operatively connecting said structures such that said displacement effects resilient deformation of said resilient member,
a pressure fluid-actuated extensible assembly also operatively connected between said structures, and
conduit means extending between said pump, said servo valve and said pressure fluid-actuated extensible assembly, the arrangement being constructed such that upon movement apart of said structures due to the wheel of the wheel assembly encountering a road surface dip, said extensible assembly is extended by pressure fluid from the pump.

16. Suspension means according to claim 15 wherein said conduit means extend between said servo valve and said extensible assembly such that upon movement towards each other of said structures due to the wheel encountering a road surface bump, fluid flows from said extensible assembly.

17. Suspension means according to claim 14 or claim 15 or claim 16, further comprising a height sensing valve, means which sense the distance between said structures controlling said height sensing valve, conduit means extending between said pump and said height sensing valve, and pressure fluid-actuated means controlled by said height sensing valve and in turn controlling said servo valve.

* * * * *